Patented May 13, 1930

1,758,912

UNITED STATES PATENT OFFICE

FERDINAND KELLER AND KARL SCHNITZSPAHN, OF OFFENBACH-ON-THE-MAIN, GERMANY, ASSIGNORS TO GENERAL ANILINE WORKS, INC., OF NEW YORK, N. Y., A CORPORATION OF DELAWARE

DIAZO-SALT PREPARATION

No Drawing. Application filed December 8, 1925, Serial No. 74,161, and in Germany December 27, 1924.

This invention relates to new diazo-salt preparations, which consist of mixtures of aromatic diazocompounds in a solid form, with metal salts of arylsulfonic acids.

In the diazo salt preparations heretofore appearing on the market, there have been used as diluting materials for the purpose of facilitating the drying and lessening the explosive danger, only inorganic diluting materials such as sodium sulfate, burnt alum or zinc sulfate.

The new mixtures of diazocompounds isolated as solids with metal salts of arylsulfonic acids are new technical preparations with especially valuable characteristics in that in the case of greatly diminished tendency to explosion, not only is the stability of such diazopreparations greater than that of the corresponding preparations with inorganic diluting materials, but also the important property of solubility of the preparations in question is favorably influenced in a wholly unexpected way by the choice of suitable arylsulfonates. By the admixture of suitable arylsulfonates, it is possible to convert into commercially useful preparations many diazosalts which would be useful theoretically in view of their stability and their coloring powers, but the use of which is impossible, due to their being difficultly soluble, as suitable arylsulfonates are used such as form easily soluble salts and not difficultly soluble salts with the diazocompounds in question. Especially suitable are the metal salts of benzol sulfonic acids and benzol disulfonic acids or metal salts of benzyl-and-1.2.3.4-tetrahydronaphthalene-sulfonic acids and metal salts of di-and-poly-sulfonic acids of the naphthalene series, such as alkali metal salts of naphthalene—1.6—, 1.7—and 2.7—disulfonic acids as well as alkali metal salts of naphthalene trisulfonic-and-tetrasulfonic-acids.

The arylsulfonic acid metal salts may be added to the separated and dried diazocompounds or they may be added to the precipitated and filtered, but still moist diazocompounds before drying the diazocompounds, whereby the danger incident to the drying may be greatly diminished in such a manner. Besides the arylsulfonic acid metal salts, still further additions may be made to the preparations, such as copper or aluminum salts, alkali chromates, and others.

Example 1

34 parts of dry chlorzinc double salt of diazotized α-naphthylamine containing 42% α-naphthylamine, which is obtained by treating a sufficiently concentrated mineral acid diazosolution with zinc chloride and sodium chloride are mixed with 66 parts of the commercial sodium salt of 1.6-naphthalene disulfonicacid.

A good stable product is obtained in this way possessing good keeping qualities.

Example 2

46 parts of dry p-chlorbenzolsulfonic acid salt of diazotized p-nitroaniline, which is obtained by treating a sufficiently concentrated mineral acid diazosolution with p-chlorbenzolsulfonic acid salt, are ground with 49 parts of commercial sodium salt of 1.6-naphthalene disulfonic acid and 5 parts of aluminum sulfate.

An excellently soluble and stable product is obtained.

Example 3

46 parts of filtered, moist chlorzinc double salt of diazotized 4-chlor-2-nitro-1-aniline of 38% chlornitroaniline content obtained as described above, are mixed with 63 parts of a mixture of sodium salts of naphthalene tri-and-tetra-sulfonic acids obtained by sulfonating 1 molecule of naphthalene with 4 molecules of sulfuric acid anhydride, and then dried at 40–50° C. The drying operation proceeds without danger of explosion and yields a very stable product.

Example 4

82 parts of dry 1.5-naphthalene disulfonic acid diazo-m-nitroaniline of a nitroaniline content corresponding to 34%, prepared by reacting the diazosolution with the sodium salt of 1.5-naphthalene disulfonic acid, are mixed with 98 parts of dry sodium salt of benzolsulfonic acid and 20 parts of sodium salt of tetralinsulfonic acid.

A good soluble product is obtained.

Example 5

37 parts of acid 1.5-naphthalene disulfonic acid diazochlortoluidine ($CH_3 : NH_2 : Cl = 1:2:4$), prepared by reacting the diazosolution with free 1.5-naphthalene disulfonic acids, are intimately ground with 5 parts of prepared chalk and 28 parts of commercial sodium salt of 1.6-naphthalenedisulfonic acid.

Similar products are obtained from the isomeric diazochlortoluidins.

Example 6

103 parts of chlorzincdoublesalt of tetrazodianisidin of 49.3% dianisidin content are ground with 142 parts of sodium salt of 2.7-naphthalene disulfonic acid and 5 parts of crystallized copper sulfate.

Example 7

280 parts of filtered wet diazosulfanilic acid of 72% content are mixed with 720 parts of dry sodium salt of 1.5-naphthalenedisulfonic acid and then dried at 40–50° C. The drying and grinding of the diazosulfanilic acid, which without the addition of the arylsulfonate is characterized by the greatest danger of explosion, follows without any difficulty.

The expression "a stabilized diazo salt" as used in the following claims is intended to comprise the heavy metal double salts of the aromatic diazo salts as well as the salts formed or prepared by reacting a diazo solution with an aromatic sulfonic acid.

We claim:

1. A diazo-salt preparation, comprising a mixture of an aromatic diazo compound in a solid form with a soluble metal salt of an arylsulfonic acid.

2. A diazo-salt preparation, comprising a mixture of an aromatic diazo compound in a solid form with a soluble metal salt of a naphthalene sulfonic acid which contains a plurality of sulfonic acid groups.

3. A diazo-salt preparation, comprising a mixture of an aromatic diazo salt in a solid form, with a soluble metal salt of a naphthalene sulfonic acid which contains a plurality of sulfonic acid groups.

4. A diazo salt preparation comprising a mixture of a diazo salt in a solid form made from an aromatic amine having the general formula $X_n$—R—$NH_2$ wherein R stands for an aryl nucleus, $n$ stands for the numeral 1 or 2, and X stands for sulfo, halogen, nitro, alkyl or alkoxy with a soluble metal salt of a naphthalene sulfonic acid which contains a plurality of sulfonic acid groups.

5. A diazo salt preparation comprising a mixture of a diazo salt in a solid form made from a nitrated diazo compound of the benzene series in which one hydrogen atom may be substituted by chlorine with a soluble metal salt of a naphthalene disulfonic acid.

6. A diazo-salt preparation comprising a mixture of an aromatic diazo compound in a solid form and an alkali metal salt of a naphthalene-sulfonic acid which contains a plurality of sulfonic acid groups.

7. A diazo-salt preparation comprising a mixture of an aromatic diazo salt in a solid form and a soluble metal salt of an arylsulfonic acid.

8. A solid diazo-salt preparation comprising a stabilized aromatic diazo salt and a soluble metal salt of an arylsulfonic acid.

9. A solid diazo-salt preparation comprising a stabilized aromatic diazo salt and an alkali metal salt of an arylsulfonic acid.

10. A solid diazo-salt preparation comprising a stabilized aromatic diazo salt and a soluble metal salt of a naphthalene sulphonic acid which contains a plurality of sulfonic acid groups.

11. A solid diazo salt preparation comprising a mixture of a stabilized aromatic diazo salt made from an aromatic amine having the general formula $X_n$—R—$NH_2$ wherein R stands for an aryl nucleus, $n$ stands for the numeral 1 or 2, and X stands for sulfo, halogen, nitro, alkyl or alkoxy and a soluble metal salt of a naphthalene sulfonic acid which contains a plurality of sulfonic acid groups.

12. A solid diazo salt preparation comprising a mixture of a stabilized aromatic diazo salt made from a nitrated diazo compound of the benzene series in which one hydrogen atom may be substituted by chlorine, and a soluble metal salt of a naphthalene disulfonic acid.

13. A solid diazo-salt preparation comprising a mixture of a heavy metal double salt of an aromatic diazo salt and a soluble metal salt of an arylsulfonic acid.

14. A solid diazo-salt preparation comprising a mixture of a heavy metal double salt of an aromatic diazo salt and an alkali metal salt of an arylsulfonic acid.

15. A solid diazo-salt preparation comprising a mixture of a heavy metal double salt of an aromatic diazo salt and a soluble metal salt of a naphthalene sulfonic acid which contains a plurality of sulfonic acid groups.

16. A solid diazo-salt preparation comprising a mixture of a heavy metal double salt of an aromatic diazo salt and an alkali metal salt of a naphthalene sulfonic acid which contains a plurality of sulfonic acid groups.

17. A solid diazo salt preparation comprising a mixture of a heavy metal double salt of an aromatic diazo salt made from an aromatic amine having the general formula $X_n$—R—$NH_2$ wherein R stands for an aryl nucleus, $n$ stands for the numeral 1 or 2, and X stands for sulfo, halogen, nitro, alkyl or alkoxy and a soluble metal salt of a naphthalene sulfonic acid which contains a plurality of sulfonic acid groups.

18. A solid diazo salt preparation comprising a mixture of a heavy metal double salt of a nitrated diazo salt of the benzene series in which one hydrogen atom may be substituted by chlorine and a soluble metal salt of a naphthalene disulfonic acid.

In testimony whereof, we affix our signatures.

Dr. FERDINAND KELLER.
KARL SCHNITZSPAHN.